(12) United States Patent
Bitterlich et al.

(10) Patent No.: US 9,637,417 B2
(45) Date of Patent: May 2, 2017

(54) MATERIAL BASED ON SIALONS

(75) Inventors: Bernd Bitterlich, Reichenbach/Fils (DE); Killian Friederich, Plochingen (DE)

(73) Assignee: CeramTec GmbH, Plochingen (DE)

( * ) Notice: Subject to any disclaimer, the term of this patent is extended or adjusted under 35 U.S.C. 154(b) by 577 days.

(21) Appl. No.: 12/515,976

(22) PCT Filed: Dec. 5, 2007

(86) PCT No.: PCT/EP2007/063353
§ 371 (c)(1),
(2), (4) Date: Jul. 30, 2009

(87) PCT Pub. No.: WO2008/068283
PCT Pub. Date: Jun. 12, 2008

(65) Prior Publication Data
US 2009/0300992 A1  Dec. 10, 2009

(30) Foreign Application Priority Data
Dec. 6, 2006  (DE) .................. 10 2006 057 820

(51) Int. Cl.
| | | |
|---|---|---|
| *B24D 3/02* | (2006.01) | |
| *C09C 1/68* | (2006.01) | |
| *C09K 3/14* | (2006.01) | |
| *C04B 35/597* | (2006.01) | |
| *C04B 35/645* | (2006.01) | |

(52) U.S. Cl.
CPC .......... *C04B 35/597* (2013.01); *C04B 35/645* (2013.01); *C04B 35/6455* (2013.01); *C04B 2235/3206* (2013.01); *C04B 2235/3225* (2013.01); *C04B 2235/3244* (2013.01); *C04B 2235/3817* (2013.01); *C04B 2235/3826* (2013.01); *C04B 2235/3843* (2013.01); *C04B 2235/3856* (2013.01); *C04B 2235/3865* (2013.01); *C04B 2235/3873* (2013.01); *C04B 2235/3886* (2013.01); *C04B 2235/5409* (2013.01); *C04B 2235/5445* (2013.01); *C04B 2235/767* (2013.01); *C04B 2235/77* (2013.01); *C04B 2235/785* (2013.01); *C04B 2235/786* (2013.01); *C04B 2235/85* (2013.01); *C04B 2235/96* (2013.01)

(58) Field of Classification Search
None
See application file for complete search history.

(56) References Cited

U.S. PATENT DOCUMENTS

| | | | |
|---|---|---|---|
| 4,547,470 A * | 10/1985 | Tanase et al. | 501/87 |
| 4,788,167 A * | 11/1988 | Mathers et al. | 51/307 |
| 5,112,780 A | 5/1992 | Goto et al. | |
| 5,200,374 A | 4/1993 | Yamada et al. | |
| 6,471,734 B1 * | 10/2002 | Yeckley | 51/307 |
| 6,610,113 B1 * | 8/2003 | Mehrotra et al. | 51/308 |
| 7,049,256 B2 * | 5/2006 | Yeckley | 501/98.2 |
| 2002/0105116 A1 * | 8/2002 | Mehrotra et al. | 51/307 |
| 2004/0026813 A1 * | 2/2004 | Mehrotra et al. | 51/307 |
| 2007/0010392 A1 | 1/2007 | Bitterlich et al. | |

FOREIGN PATENT DOCUMENTS

| | | |
|---|---|---|
| EP | 0 227 471 | 7/1987 |
| EP | 0 397 525 A | 11/1990 |
| EP | 0 479 485 | 4/1991 |
| EP | 0 792 854 | 9/1997 |
| JP | 03 153574 A | 7/1981 |
| JP | 59232971 A * | 12/1984 |
| JP | 03 208866 A | 9/1991 |
| WO | WO 97/48659 A | 12/1997 |
| WO | WO 0002829 A2 * | 1/2000 |
| WO | WO 2005/016847 A | 2/2005 |

OTHER PUBLICATIONS

Song, et al, "S13N4 and S13N4-S1C Particulate Composite Ceramics", J. Mater Process Technol; Journal of Materials Processing Technology (1996) (XP002485343).

* cited by examiner

*Primary Examiner* — Kaj K Olsen
*Assistant Examiner* — Ross J Christie
(74) *Attorney, Agent, or Firm* — Norton Rose Fulbright US LLP

(57) ABSTRACT

Sialon materials contain $HFO_2$ in a maximum of 1 mass-% as a sintering additive, methods of producing them and methods of using them an $\alpha/\beta$-SiAlON material with 5 mass % to 50 mass %, $\alpha/(\alpha/\beta)$ RE-$\alpha$-SiAlON wherein RE stands for at least one cation selected from the group consisting of Y, Sc, Lu, La, Ce, Pr, Nd, Pm, Sm, Eu, Gd, Tb, Dy, Ho, Er, Tm, Yb, Mg or Ca, and 95 mass % to 50 mass %, $\beta/(\alpha/\beta)$ $\beta$-SiAlON and of an Hf-containing amorphous or partially crystalline grain-boundary phase with a proportion with respect to the overall material is below 10 vol %, wherein the Hf content of the sintered material is 0.2 mass % to 1.0 mass %, and of a dispersion phase comprising globular particles with a mean particle size of from 0.2 μm to 15 μm, containing at least one hard material selected from the group consisting of SiC, TiN, TiC, Ti(C,N), carbides of further elements of groups IVb, Vb and VIb of the periodic system, nitrides of further elements of groups IVb, VB and VIb of the periodic system, scandium carbide and scandium oxycarbide, which are contained in the sintered compact in a proportion from 5 vol % to 30 vol %.

11 Claims, No Drawings

MATERIAL BASED ON SIALONS

This application is a §371 of PCT/EP2007/063353 filed Dec. 5, 2007, which claims priority from DE 10 2006 057 820.1 filed Dec. 6, 2006

SiAlON (sialon) materials are suitable, by reason of their high wear resistance, for machining metallic materials, preferentially cast iron. In particular, alpha/beta-SiAlONs possess a favourable combination of hardness and toughness. In addition to the mechanical properties at room temperature, for application as a ceramic cutting material the properties at temperatures around 800° C. to 1000° C. are also crucial. However, an economical production of SiAlONs is only possible by using sintering aids. Although the latter simplify the densification of the material, after cooling they remain behind in the product in the form of predominantly vitrified grain-boundary phase. The softening of this grain-boundary phase determines the mechanical and chemical properties of the material at elevated temperatures. When machining metallic materials, wear is chiefly caused by mechanical abrasion, and additionally by chemical reactions. A high resistance to wear can accordingly only be achieved if hardness, toughness and chemical resistance remain high also at the application temperatures. The quantity and composition of the vitrified grain-boundary phase therefore has a key function as regards wear.

Improved high-temperature properties can be obtained, in principle, by using a smaller quantity of sintering additives. This leads to less grain-boundary phase in the product, as a result of which in the course of the softening of the grain-boundary phase at high temperatures the influence on the material properties is slighter. Since conventional cutting materials already possess very small quantities of additive, a further reduction is scarcely possible on account of the deteriorating sintering properties when, in particular, economical gas-pressure sintering is to be employed.

The hardness of SiAlON materials at higher temperatures can also be increased by the addition of particles of hard material such as, for example, SiC, as is known from WO 2005/016847 A1.

In EP 0 479 485 A1 it is described how an SiC-reinforced beta-SiAlON material can be densified more easily by the addition of 1 mass % to 60 mass % $HfO_2$ without the additional $HfO_2$ addition negatively influencing the high-temperature properties. In the course of sintering, the $HfO_2$ forms a liquid phase which promotes the densification but which is present as 'disperse phase' after the sintering process.

In U.S. Pat. No. 5,200,374 A it is described that upon addition of $HfO_2$ after the sintering an Hf-oxide phase with defective fluorite structure is formed in which trivalent ions—such as, for example, rare-earth elements—are embedded.

Also in other publications—such as in EP 0 227 471 A2 and EP 0 792 854 A2—it is described how $HfO_2$ or a similar additive can be admixed in order to obtain a sufficient ultimate density in the case of a material that is difficult to densify. In each case, however, as is known from EP 0 479 485 A2 in particular, a minimum quantity of 1 mass % $HfO_2$ is regarded as necessary in order to achieve a noticeable improvement in the densification behaviour.

The object of the present invention is to make available a wear-resistant SiAlON material that, despite low proportions of sintering aids, in particular Hf, can also be densified by more economical gas-pressure sintering instead of elaborate hot pressing (HP) or hot isostatic pressing (HIP).

In the case of the material according to the invention, based on SiAlONs, a smaller addition of Hf than in the case of conventional SiAlON materials already suffices in order to obtain good sintering properties and improved wear resistance in the course of machining. The material according to the invention is sintered at temperatures from 1750° C. to 2000° C. It can be densified by gas-pressure sintering to >99% theoretical density.

The α/β-SiAlON material according to the invention contains 5 mass % to 50 mass %, preferably 5 mass % to 30 mass %, $\alpha/(\alpha+\beta)$ RE-α-SiAlON, where RE stands for at least one cation selected from Y, Sc, Lu, La, Ce, Pr, Nd, Pm, Sm, Eu, Gd, Tb, Dy, Ho, Er, Tm, Yb, Mg or Ca, preferably at least one cation selected from Y, Sc, Lu, La, Ce, Pr, Nd, Pm, Sm, Eu, Gd, Tb, Dy, Ho, Er, Tm, Yb and additionally at least one cation selected from Mg or Ca, and also 95 mass % to 50 mass %, preferably 95 mass % to 70 mass %, $\beta/(\alpha+\beta)$ β-SiAlON and of an Hf-containing amorphous or partially crystalline grain-boundary phase with a proportion with respect to the overall material amounting to below 10 vol %. The Hf content of the sintered material amounts to 0.2 mass % to 1.0 mass %, preferably 0.3 mass % to 0.8 mass %, particularly preferably 0.4 mass % to 0.6 mass %. The dispersion phase contains globular particles with mean particle sizes from 0.2 μm to 15 μm, preferably 0.4 μm to 10 μm, consisting of at least one hard material selected from SiC, TiN, TiC, Ti(C,N), carbides and/or nitrides of further elements of groups IVb, Vb and VIb of the periodic system and also scandium carbide and/or scandium oxycarbide or mixtures of the listed hard materials, which are contained in the sintered compact in a proportion from 5 vol % to 30 vol %, preferably 7.5 vol % to 20 vol %, particularly preferably 10 vol % to 15% vol %.

The raw-material mixture of the α/β-SiAlON—SiC material contains the components $Si_3N_4$, $Al_2O_3$, AlN, MgO, $Y_2O_3$, $HfO_2$ and SiC, the proportion of SiC amounting to 5 vol % to 30 vol %, preferably 7.5 vol % to 20 vol %, particularly preferably 10 vol % to 15 vol %, the proportion of $HfO_2$ amounting to 0.2 mass % to 1.0 mass %, preferably 0.3 mass % to 0.9 mass %, particularly preferably 0.4 mass % to 0.8 mass %, the total additive proportion amounting to 6.0 to 10.0, preferably 6.5 to 9.0, particularly preferably 7.0 to 8.5, and the atomic % ratio of Y to Mg amounting to 7.0 to 10.0, preferably 7.5 to 9.0, particularly preferably 8.0 to 8.5.

In the melt phase of the other sintering additives $HfO_2$ possesses a low solubility, which depends on the composition of the initial mixture. In the course of cooling, the dissolved Hf partially precipitates in the grain-boundary phase as a finely distributed crystalline Hf phase. The addition of a small quantity of Hf oxide accordingly increases the quantity of melt phase during the sintering operation but does not lead to more vitrified grain-boundary phase in the product. Hence there is a possibility to reduce the quantity of the other sintering additives without impairing the sinterability. Excess $HfO_2$ which is unable to dissolve in the liquid phase can be converted into dispersely distributed Hf nitrides by means of an $N_2$-rich atmosphere in the course of sintering.

Only through the addition of $HfO_2$ with, at the same time, slightly reduced quantity of other additives can a noticeable improvement in the wear behaviour be established, as will be demonstrated on the basis of exemplary embodiments (see Table 2). An addition of more than 1 mass % $HfO_2$, on the other hand, impairs the properties of the material, as will be shown on the basis of examples. The simultaneous use of sintering additives with different cations—such as, for example, Y and Mg in the exemplary embodiments—positively influences the sintering behaviour in addition to the addition of Hf. It is presumed, however, that also in the case of raw-material mixtures with only one cation an additional Hf addition brings about the advantages that have been described.

Rather than in the form of oxide, the Hf can also be introduced in another form, as an organic or inorganic compound. If the Hf is introduced in the form of pulverulent compound, for example as $HfO_2$, the size of the powder particles should amount to only a few μm. If the powder particles are too coarse, they dissolve only slowly during the sintering, and hence barely contribute to the increase of the liquid phase, bringing about no improvement of the sintering properties.

After sintering, no indications, or only very weak indications, of the presence of a crystalline Hf-oxide phase can be detected with conventional radiographic analytical methods, for example XRD, since the contents thereof are too small, i.e. less than approximately 1 mass %. Depending on the sintering conditions, however, small quantities of Hf-oxynitride or Hf-nitride phases can be detected, which in the case of high Hf contents are even visible in the SEM (scanning electron microscope) as disperse particles with a diameter of approximately 0.5 μm.

Besides SiC, all other hard-material particles that do not enter into reactions with the other components of the material according to the invention are accordingly possible. However, the size of the admixed hard-material particles is to be borne in mind. If these are too small, below 0.2 μm, on account of the large surface area of the powder a lot of glass phase is needed for the purpose of wetting, which is not present in sintering. If the hard-material particles are too coarse, approximately in the region of over 15 μm, an impediment to sintering results.

The invention will be elucidated in more detail on the basis of exemplary embodiments. Three groups of materials were formed, which are listed in the following Tables 1 and 2. From the respective materials, sintered compacts were produced in the form of cutting tools. The effect of the addition of $HfO_2$ to Y—Mg alpha/beta SiAlON materials of varying composition on the sintering behaviour and on the wear in the course of machining was compared.

For the purpose of producing a SiAlON material according to the invention as used in the exemplary embodiments, fine or finely ground $Si_3N_4$ powder with a grain size of D50≤1 μm and with a specific surface area ≥10 m²/g and also SiC in the form of hard-material particles with a grain size D50 of approximately 0.6 μm with addition of the remaining pulverulent raw materials and of known binding agents were mixed and axially pressed the granular material at 140 MPa to 200 MPa.

After debinding, sintering was effected. The exemplary embodiments were all produced by means of gas-pressure sintering at 1930° C. and at a gas pressure of 100 bar. The dwell-time amounted to three hours.

From the material, cutting tools were produced, with which machining tests were carried out on brake discs consisting of the material GG15. In these tests, the brake discs were turned at a cutting speed of vc=1000 m/min, with a feed of f=0.50 mm/rev, with a depth of cut of ap=2.0 mm, and with a setting angle of α=85°.

TABLE 1

Exemplary embodiments: data of the raw-material mixture

| | | Mixture of raw materials | | | | | |
|---|---|---|---|---|---|---|---|
| Group | No. | $Si_3N_4$ [mass %] | AlN [mass %] | Atomic % ratio Y:Mg | Total additive content [mass %] [1] | Hf [mass %] | SiC [vol. %] |
| A | 1 (Ref.) | 89.5 | 5.00 | 7.5 | 10.5 | — | — |
| A | 2 | 88.5 | 5.00 | 7.5 | 11.5 | 0.85 | — |
| A | 3 | 85.5 | 5.00 | 7.5 | 14.5 | 3.39 | — |
| B | 4 (Ref.) | 66.0 | 4.14 | 9.0 | 9.3 | — | 25 |
| B | 5 | 65.0 | 4.14 | 9.0 | 10.3 | 0.85 | 25 |
| B | 6 | 65.3 | 4.14 | 9.0 | 10.0 | 0.42 | 25 |
| C | 7 (Ref.) | 80.8 | 4.14 | 9.0 | 9.3 | — | 10 |
| C | 8 | 81.1 | 4.14 | 8.5 | 9.0 | 0.85 | 10 |
| C | 9 | 81.3 | 4.14 | 8.3 | 8.8 | 0.76 | 10 |
| C | 10 | 81.7 | 4.14 | 8.3 | 8.4 | 0.69 | 10 |
| C | 11 | 82.4 | 4.14 | 8.2 | 7.7 | 0.58 | 10 |
| C | 12 | 83.2 | 4.14 | 9.2 | 6.9 | 0.46 | 10 |

[1] Corresponds to the quantity of AlN + $Al_2O_3$ + MgO + $Y_2O_3$ + $HfO_2$, the substances that form the liquid phase in the course of sintering (oxide impurity of the $Si_3N_4$ or AlN disregarded). The mass % ratio of $Al_2O_3$ to MgO always amounts to 2.53.

TABLE 2

Exemplary embodiments: properties

| | | Properties of the material | | | | |
|---|---|---|---|---|---|---|
| Group | No. | Density [% th.] | Alpha-SiAlON [mass %] [2] | Hardness [HV10] | Toughness KIC [MPam1/2] | Wear w.r.t. reference |
| A | 1 (Ref.) | 99.8 | 42 | 1782 | 6.3 | 1 |
| A | 2 | 99.8 | 38 | 1697 | 5.9 | — *) |
| A | 3 | 99.7 | 19 | 1582 | 6.3 | — *) |

TABLE 2-continued

Exemplary embodiments: properties

Properties of the material

| Group | No. | Density [% th.] | Alpha-SiAlON [mass %] (2) | Hardness [HV10] | Toughness KIC [MPam1/2] | Wear w.r.t. reference |
|---|---|---|---|---|---|---|
| B | 4 (Ref.) | 99.8 | 25 | 2053 | 6.3 | 1 |
| B | 5 | 99.8 | 33 | 1897 | 5.8 | 1.06 |
| B | 6 | 99.8 | 41 | 1893 | 6.1 | 1.03 |
| C | 7 (Ref.) | >99.8 | 30 | 1746 | 6.3 | 1 |
| C | 8 | >99.8 | 17 | 1707 | 5.8 | 0.96 |
| C | 9 | >99.8 | 20 | 1758 | 6.0 | 0.94 |
| C | 10 | >99.8 | 20 | — *) | — *) | — *) |
| C | 11 | >99.8 | 18 | 1744 | 5.8 | 0.81 |
| C | 12 | 88 | — *) | — *) | — *) | — *) |

*) not determined
(2) In the sintered components; proportion of alpha-SiAlON, relative to the total quantity of alpha- and beta-SiAlON, i.e. $\alpha/(\alpha + \beta)$ in mass %.

Group A (Nos. 1 to 3):
The influence of the addition of $HfO_2$ to an $\alpha/\beta$-SiAlON composition: the hardness diminishes, the toughness is not changed significantly. Machining tests were not carried out, on account of the low hardness. An additional addition of Hf to a conventional SiAlON composition accordingly impairs the hardness, which would have an immediate effect on a higher wear in the course of machining.

Group B (Nos. 4 to 6):
The influence of the addition of $HfO_2$ to an SiC-containing $\alpha/\beta$-SiAlON: here, despite the high proportion of SiC, the hardness likewise diminishes noticeably.

The wear is increased in comparison with the Hf-free composition. The sinterability of the SiAlON containing a high quantity of hard material is not noticeably improved by the small addition of Hf.

Group C (Nos. 7 to 12):
The influence of the addition of $HfO_2$ to an SiC-containing SiAlON in which the total additive content, i.e. the sum of all the additives of the raw-material mixture that form a melt, is not increased, despite additional addition of $HfO_2$: the conventional quantity of sintering additive is reduced and is added as compensating $HfO_2$, which, as described above, increases the quantity of the liquid phase in the course of sintering but crystallises in the course of cooling and brings about a high-temperature-stable grain-boundary phase. The compensating quantity of $HfO_2$ can even be lower than the reduced quantity of the remaining sintering additives. The hardness is not noticeably influenced; the wear, however, is lowered. The better wear behaviour is caused in this case by the lower content of amorphous grain-boundary phase, bringing about a better high-temperature hardness and slighter chemical reactions with the material of the workpiece.

The invention claimed is:

1. A sintered material based on SiAlONs, comprising an $\alpha/\beta$-SiAlON material with 5 mass % to 50 mass %, $\alpha/(\alpha+\beta)$ RE-$\alpha$-SiAlON wherein RE stands for at least one cation selected from the group consisting of Y, Sc, Lu, La, Ce, Pr, Nd, Pm, Sm, Eu, Gd, Tb, Dy, Ho, Er, Tm and Yb, and additionally at least one cation selected from the group consisting of Mg and Ca, and 95 mass % to 50 mass %, $\beta/(\alpha+\beta)$ $\beta$-SiAlON and Hf-containing amorphous or partially crystalline grain-boundary phase, wherein said sintered material has an Hf content of from 0.2 mass % to 1.0 mass %, and a dispersion phase comprising globular particles with a mean particle size of from 0.2 μm to 15 μm, containing at least one hard material selected from the group consisting of SiC, TiN, TiC, Ti(C,N), scandium carbide and scandium oxycarbide, which are contained in the sintered compact in a proportion from 5 vol % to 30 vol %, wherein the globular particles do not contain HfN or HfC.

2. A sintered material according to claim 1, wherein the Hf content ranges from 0.4 mass % to 0.6 mass %.

3. A sintered material according to claim 2, wherein the $Si_3N_4$ powder exhibits a specific surface area of $\geq 10$ m²/g.

4. A sintered material according to claim 1, wherein the hard-material particles have a grain size between 0.2 μm and 15 μm.

5. A sintered material according to claim 4, containing SiC having a grain size of 0.6 μm.

6. A sintered material according to claim 1, wherein the theoretical density is greater than 99%.

7. A sintered compact comprising material according to claim 1 in sintered form, wherein the sintered compact is a cutting tool.

8. A process for producing a sintered material based on SiAlONs according to claim 1 comprising the steps of:
axial pressing a binder-containing pressed granular material at 140 MPa to 200 MPa,
debinding at a temperature matched to the binder, and
subsequently sintering at a temperature between 1750° C. and 2000° C. to yield a sintered compact comprising the sintered material.

9. A process according to claim 8, wherein a raw-material mixture of the $\alpha/\beta$-SiAlON—SiC material of the composition $\alpha/\beta$-SiAlON and $\alpha/(\alpha+\beta)$ RE-$\alpha$-SiAlON comprising $Si_3N_4$, $Al_2O_3$, AlN, MgO, $Y_2O_3$, $HfO_2$ and hard-material particles of the SiC, TiN, TiC, Ti(C,N), carbides in a grain size from 0.2 μm to 15 μm with a proportion from 5 vol % to 30 vol %, and having a proportion of $HfO_2$ from 0.2 mass % to 1.0 mass %, is produced, wherein the atomic % ratio of Y to Mg is 7.0 to 10.0, and wherein the $Si_3N_4$ powder has a grain size of D50≤1 μm and a specific surface area ≥10 m²/g.

10. A process according to claim 8, wherein the mixture is subjected to gas-pressure sintering at 1930° C. and at 100 bar gas pressure in a dwell-time of 3 hours.

11. A sintered compact, produced by a process according to claim 8, wherein the sintered compact is a cutting tool.

* * * * *